United States Patent
Potts et al.

(10) Patent No.: US 9,689,573 B2
(45) Date of Patent: Jun. 27, 2017

(54) COMBUSTION EQUIPMENT HAVING A SEALING MEMBER THAT INCLUDES A FLEXIBLE SLEEVE

(71) Applicant: ROLLS-ROYCE PLC, London (GB)

(72) Inventors: Jason Robert Potts, Stoke-on-Trent (GB); Simon Mark Jolliff, London (GB)

(73) Assignee: ROLLS-ROYCE PLC, London (GB)

( * ) Notice: Subject to any disclaimer, the term of this patent is extended or adjusted under 35 U.S.C. 154(b) by 238 days.

(21) Appl. No.: 14/303,223

(22) Filed: Jun. 12, 2014

(65) Prior Publication Data

US 2014/0366543 A1 Dec. 18, 2014

(30) Foreign Application Priority Data

Jun. 12, 2013 (GB) .................. 1310429.4

(51) Int. Cl.
*F23R 3/28* (2006.01)
*F02C 7/28* (2006.01)
(Continued)

(52) U.S. Cl.
CPC .............. *F23R 3/283* (2013.01); *F02C 7/222* (2013.01); *F02C 7/28* (2013.01); *F23R 3/002* (2013.01);
(Continued)

(58) Field of Classification Search
CPC ............ F23R 3/283; F23R 2900/00001; F23R 2900/00012; F02C 7/222
See application file for complete search history.

(56) References Cited

U.S. PATENT DOCUMENTS 3,879,940 A * 4/1975 Stenger .................. F23R 3/283
239/600
4,409,791 A 10/1983 Jourdain et al.
(Continued)

FOREIGN PATENT DOCUMENTS

EP 0 030 880 A1 6/1981
EP 1 865 261 A2 12/2007
(Continued)

OTHER PUBLICATIONS

Search Report issued in British Patent Application No. 1310429.4 dated Dec. 11, 2013.
(Continued)

*Primary Examiner* — Gerald L Sung
*Assistant Examiner* — Scott Walthour
(74) *Attorney, Agent, or Firm* — Oliff PLC (57) ABSTRACT

Combustion equipment for use in a gas turbine engine is provided. The combustion equipment includes an inner and outer case, wherein the outer case encloses the inner case creating a cavity located between the two cases. The combustion equipment also has a fuel delivery device for delivering fuel into a combustion region within the inner case, wherein the fuel delivery device passes through a hole in the outer case and a corresponding hole in the inner case. The combustion equipment also includes a seal assembly to prevent the leaking of pressurized gas into the cavity located between the outer and inner cases via the hole through which fuel delivery device passes. The seal assembly includes a flexible sleeve that extends around the fuel delivery device and interconnects the inner case with the outer case, permitting relative movement of the inner and outer cases when the combustion equipment is in use.

21 Claims, 6 Drawing Sheets

(51) Int. Cl.
*F02C 7/22* (2006.01)
*F23R 3/00* (2006.01)

(52) U.S. Cl.
CPC ............ *F23R 2900/00001* (2013.01); *F23R 2900/00012* (2013.01); *Y02T 50/671* (2013.01); *Y10T 29/49233* (2015.01)

(56) References Cited

U.S. PATENT DOCUMENTS

| | | | |
|---|---|---|---|
| 4,567,730 A * | 2/1986 | Scott | F23R 3/007 60/752 |
| 5,242,117 A | 9/1993 | D'Agostino et al. | |
| 5,765,366 A * | 6/1998 | Beeck | F02C 7/222 239/431 |
| 5,771,696 A * | 6/1998 | Hansel | F23R 3/283 60/739 |
| 2006/0255549 A1 * | 11/2006 | Amos | F16J 15/0887 277/644 |
| 2007/0151259 A1 * | 7/2007 | Thornton | F02C 7/222 60/797 |
| 2014/0137567 A1 * | 5/2014 | Park | F02C 3/14 60/796 |

FOREIGN PATENT DOCUMENTS

| | | |
|---|---|---|
| GB | 2 097 112 A | 10/1982 |
| GB | 2 433 984 A | 7/2007 |
| GB | 2 438 316 A | 11/2007 |
| GB | 2462915 A | 3/2010 |

OTHER PUBLICATIONS

Oct. 30, 2014 Search Report issued in European Application No. 14170797.

* cited by examiner

(PRIOR ART)

COMBUSTION EQUIPMENT HAVING A SEALING MEMBER THAT INCLUDES A FLEXIBLE SLEEVE

FIELD OF THE INVENTION

The present invention relates to combustion equipment for use in a gas turbine engine and to a gas turbine engine incorporating such combustion equipment.

BACKGROUND OF THE INVENTION

Some large civil gas turbine engines have combustion equipment that uses a twin case architecture, with an inner case and an outer case. In such engines, fuel spray nozzles are usually attached to the inner case, with the fuel spray nozzles passing through the outer case in order to allow the fuel spray nozzles to be attached to the inner case. To allow the fuel spray nozzles to pass through the outer case, the outer case typically has a respective hole for each fuel spray nozzle. In practice, these holes should be sealed, otherwise pressurised air inside a cavity between the outer case and the inner case may leak out, potentially reducing the engine efficiency and/or damaging other engine components.

SUMMARY OF THE INVENTION

A first aspect of the invention may provide combustion equipment for use in a gas turbine engine, the combustion equipment having:
  an inner case and an outer case, wherein the outer case encloses the inner case so that a cavity is located between the inner and outer cases;
  a fuel delivery device for use in delivering fuel into a combustion region within the inner case, wherein the fuel delivery device passes through a hole in the outer case and a corresponding hole in the inner case; and
  a seal assembly configured to seal the hole in the outer case through which the fuel delivery device passes so as to inhibit pressurised gas in the cavity located between the inner and outer cases from leaking out from the hole in the outer case when the combustion equipment is in use;
  wherein the seal assembly includes a sealing member, the sealing member comprises a flexible sleeve that extends around the fuel delivery device, the flexible sleeve interconnects the inner case with the outer case, the flexile sleeve is attached to the inner case and is attached to the outer case, the flexible sleeve being configured to flex so as to permit relative movement of the inner and outer cases when the combustion equipment is in use.

The flexible sleeve preferably allows relative movement of the outer and inner cases whilst substantially preventing leakage. Further, the flexible sleeve need not include any rubbing/sliding parts, so preferably reduces or even completely avoids wear so that the seal assembly need not deteriorate with use.

Optional features of the invention will now be set out. These are applicable singly or in any combination with any aspect of the invention.

Preferably, the flexible sleeve is or includes a flexible tube.

Preferably, the flexible tube is a bellows that includes a plurality of folds. The flexible sleeve may be formed of a folded sheet, for example.

The flexible sleeve preferably extends continuously around the fuel delivery device, i.e. with no gaps.

Preferably, the seal assembly includes:
  an upper flange attached to the flexible sleeve at an upper end of the flexible sleeve, wherein the flexible sleeve connects to the outer case via the upper flange, and/or
  a lower flange attached to the flexible sleeve at a lower end (which is preferably opposite the upper end) of the flexible sleeve, wherein the flexible sleeve connects to the inner case via the lower flange.

The upper flange may be attached to the outer case and the lower flange is attached to the inner case.

The upper flange may be attached to a cap, the cap is attached to the outer case and the lower flange is attached to the inner case.

The flexible sleeve is preferably of a material that can withstand high temperatures, e.g. temperatures of 500° C. or higher. For example, the flexible sleeve may be of a metal alloy suitable of withstanding high temperatures, e.g. a nickel alloy such as Inconel (RTM) 625.

Preferably, the flexible sleeve is configured to twist and stretch in use so as to permit relative movement of the inner and outer cases when the combustion equipment is in use.

The relative movement of the inner and outer cases permitted by (the flexing of) the flexible sleeve preferably includes relative axial movement of the cases and relative radial movement of the cases (such relative movements are described in more detail below).

Preferably, the seal assembly includes a secondary seal that is located between the flexible sleeve and the cavity located between the inner and outer cases such that an additional cavity is formed between the secondary seal and the flexible sleeve.

The secondary seal may be held in position by a lower flange attached to the flexible sleeve at a lower end of the flexible sleeve and/or a retaining plate (preferably both).

The secondary seal is preferably a solid metal ring. In other embodiments, the secondary seal may be a piston ring or may be omitted altogether.

A liner may be provided in the hole in the outer case, the liner is arranged around the flexible sleeve, the additional cavity is formed by the liner, the flexible sleeve and the secondary seal.

The additional cavity may be formed by the liner, the flexible sleeve, the cap and the secondary seal.

The combustion equipment may have:
  a plurality of fuel delivery devices for use in delivering fuel into a combustion region within the inner case, wherein each fuel delivery device passes through a respective hole in the outer case and a respective corresponding hole in the inner case; and
  a plurality of the seal assemblies, wherein each seal assembly is configured to seal a respective hole in the outer case through which a respective fuel delivery device passes so as to inhibit pressurised gas in the cavity located between the inner and outer cases from leaking out from the respective hole in the outer case when the combustion equipment is in use;
  wherein each seal assembly includes a sealing member, each sealing member comprises a flexible sleeve that extends around a respective fuel delivery device and interconnects the inner case with the outer case, the flexible sleeve being configured to flex so as to permit relative movement of the inner and outer cases when the combustion equipment is in use.

A second aspect of the invention may provide a gas turbine engine including combustion equipment according to the first aspect of the invention.

A third aspect of the invention may provide a method of modifying combustion equipment of a gas turbine engine, wherein the combustion equipment has:
- an inner case and an outer case, wherein the outer case encloses the inner case so that a cavity is located between the inner and outer cases;
- a fuel delivery device for use in delivering fuel into a combustion region within the inner case, wherein the fuel delivery device passes through a hole in the outer case and a corresponding hole in the inner case;
- the method including:
- installing a seal assembly that seals the hole in the outer case through which the fuel delivery device passes so as to inhibit pressurised gas in the cavity located between the inner and outer cases from leaking out from the hole in the outer case when the combustion equipment is in use;
- wherein the seal assembly includes a sealing member, the sealing member comprises a flexible sleeve that extends around the fuel delivery device and interconnects the inner case with the outer case, the flexible sleeve being configured to flex so as to permit relative movement of the inner and outer cases when the combustion equipment is in use.

The invention also includes any combination of the aspects and preferred features described except where such a combination is clearly impermissible or expressly avoided.

Further optional features of the invention are set out below.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1:
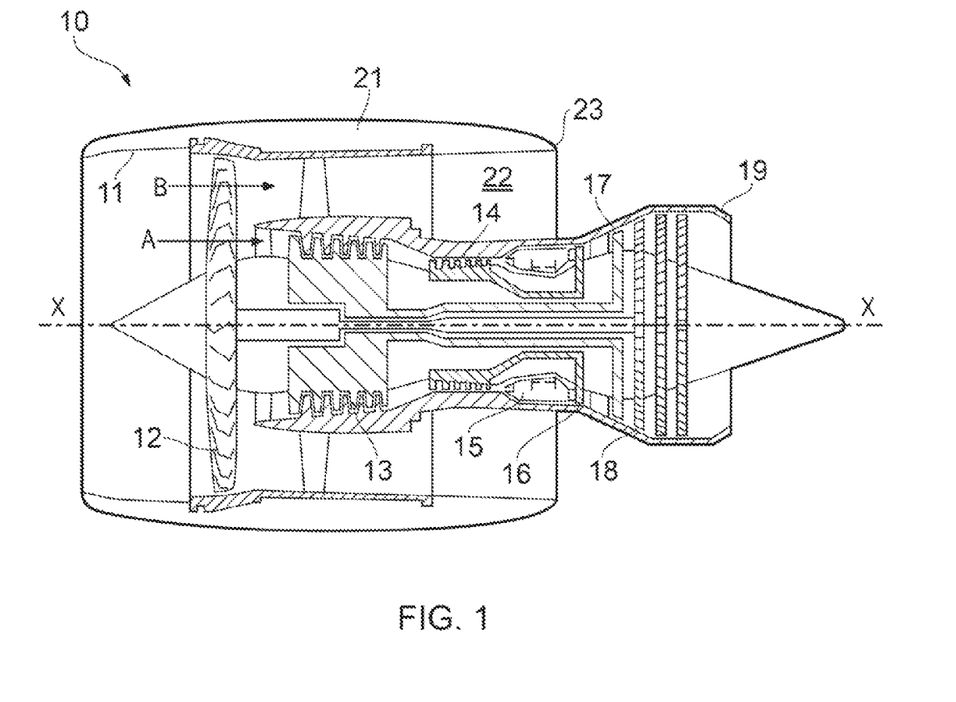
FIG. 1 shows a ducted fan gas turbine engine which may incorporate the invention.

With reference to FIG. 1, a ducted fan gas turbine engine which may incorporate the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

Figure 2:
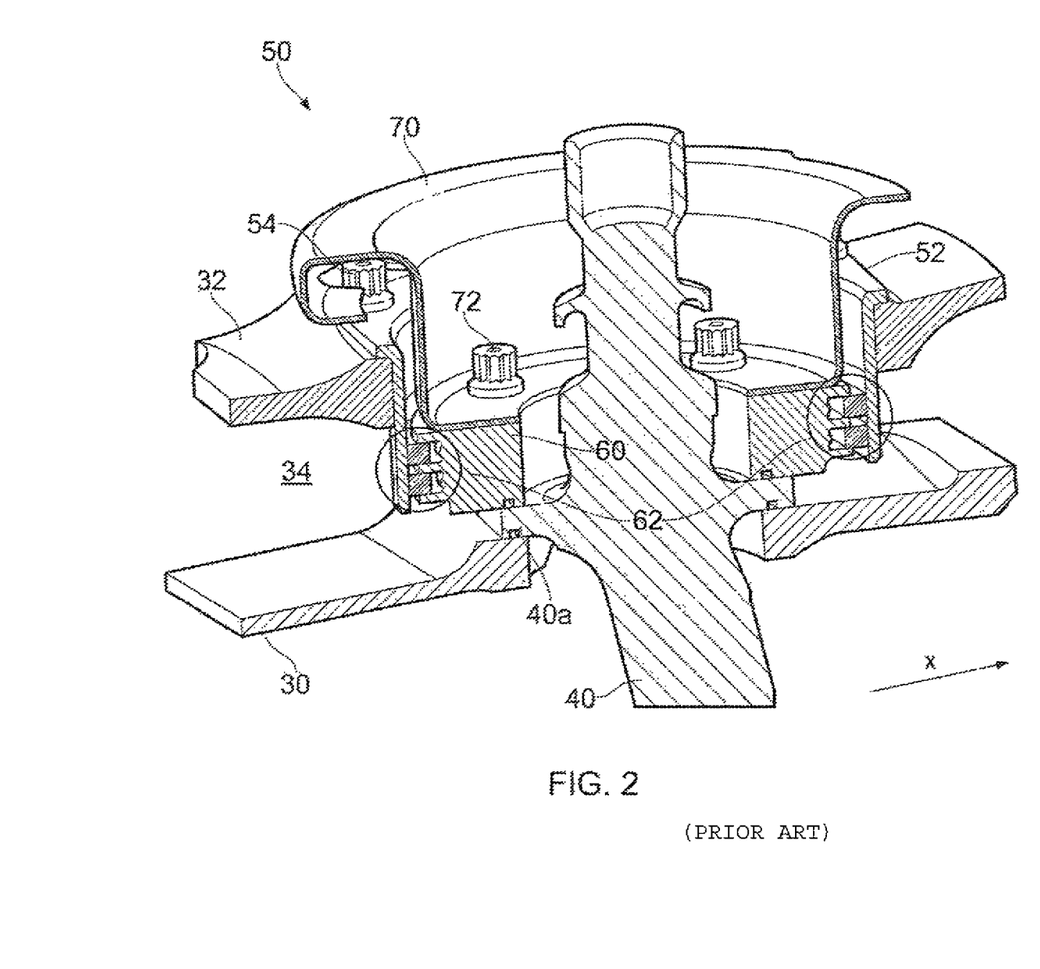
FIG. 2 is a 3D cross-sectional view of a seal assembly not in accordance with the invention and is referred to herein for brevity as a "legacy seal assembly".
Figure 3:
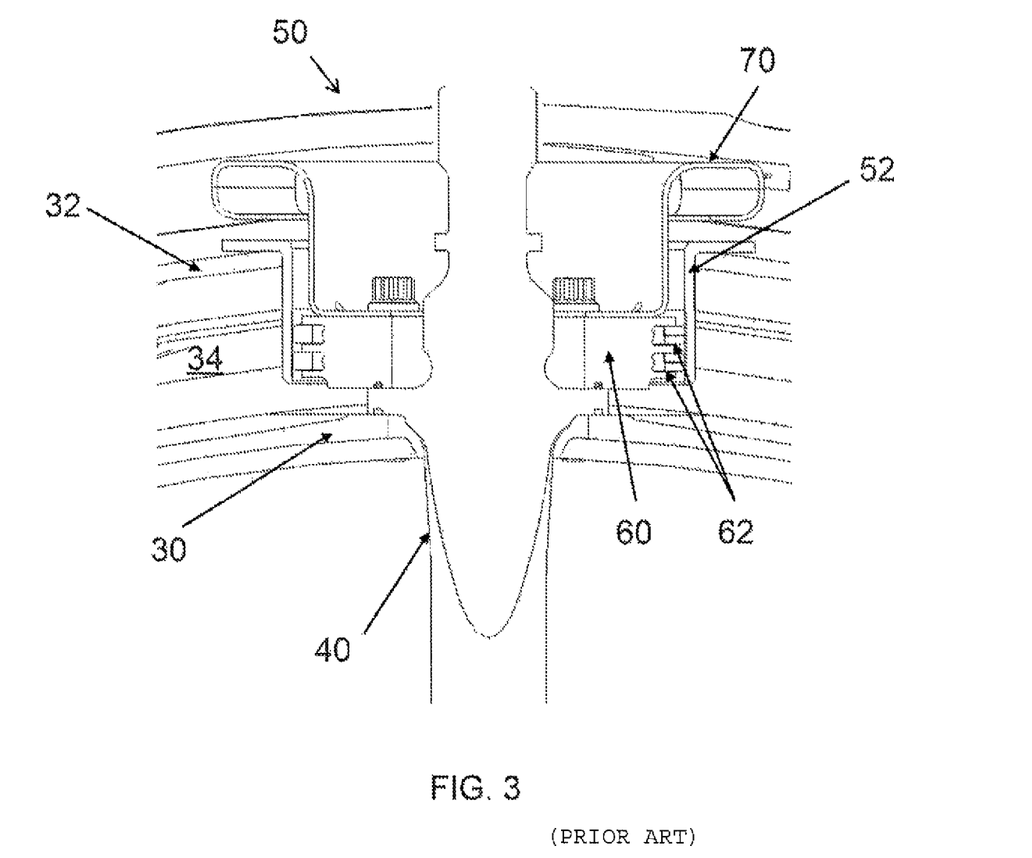
FIG. 3 is a 2D cross-sectional view of the seal assembly of FIG. 2, taken through a plane that is perpendicular to the principal axis of a gas turbine engine in which the seal assembly is installed.

With reference to FIGS. 2 and 3, typically, if the gas turbine engine is for use e.g. in large civil aircraft, the combustion equipment 15 may have an inner case 30 (sometimes "combustion inner case" or "CIC") and an outer case 32 (sometimes "combustion outer case" or "COC"), wherein the outer case 32 encloses the inner case 30 so that a cavity 34 is located between the inner and outer cases 30, 32. The combustion equipment 15 may further have a plurality of (e.g. twenty) fuel delivery devices 40 for use in delivering fuel into a combustion region within a combustion chamber within the inner case 30 of the combustion equipment 15, wherein each fuel delivery device 40 passes through a respective hole in the outer case 32 and a respective, corresponding hole in the inner case 30.

Each fuel delivery device 40 is preferably a fuel spray nozzle, which may be a single-piece element, and preferably extends through a respective hole in the outer case 32 and a respective corresponding hole in the inner case 30.

The cavity 34 located between the inner and outer cases 30, 32 may contain pressurised gas, e.g. pressurised air, e.g. from the HP compressor 14, e.g. for use elsewhere in the engine. Accordingly, the holes in the outer case 32 are preferably sealed, otherwise the pressurised gas inside the cavity between the outer case and the inner case may leak out, potentially reducing the engine efficiency and/or damaging other engine components.

The legacy seal assembly 50 shown in FIGS. 2 and 3 is an example of a seal assembly configured to seal a hole in the outer case 32 through which a fuel delivery device 40 passes, so as to inhibit pressurised gas in the cavity 34 located between the inner and outer cases 30, 32 from leaking out from the hole in the outer case 32 when the combustion equipment 15 is in use.

The legacy seal assembly 50 is not in accordance with the present invention, but is shown for the purposes of better understanding the present invention.

The principal axis of a gas t e in which the combustion equipment 15 is installed is labelled "x" in FIG. 2.

The legacy seal assembly 50 includes a liner 52 for the hole in the outer case 32 (sometimes this liner is referred to as the "combustion outer case liner" or "COC liner"), a seal carrier 60, two piston rings 62, and an air deflector 70.

Preferably, the liner 52 is a rigid, generally cylindrical, sleeve that fits into the hole in the outer case 32 and forms a tight seal with the hole in the outer case 32. Preferably, the liner 52 is attached to the outer case 32 by a plurality of bolts 54 which pass through a flange of the liner 52.

Preferably, the two piston rings 62 are mounted on the seal carrier 60, which acts to carry and confine movement of the piston rings 62.

Preferably, the piston rings 62 are outwardly sprung split rings that include a split/gap. These piston rings 62 act to seal the hole in the outer case 32 by pushing outwardly against the liner 52, thereby inhibiting pressurised gas in the cavity 34 located between the inner and outer cases 30, 32 from leaking out from the hole in the outer case 32 when the combustion equipment is in use.

Tooling may be used to aid mounting the piston rings 62 onto the liner 52.

The air deflector 70 is preferably configured to deflect any pressurised gas that does leak out from the hole in the outer case 32 away from sensitive components located above the legacy seal assembly 50, as these sensitive components may be unable to withstand the temperature of this leaked pressurised gas.

A plurality of bolts 72 pass through, in order, the air deflector 70, the seal carrier 60, a flange 40a on the fuel delivery device 40 and the inner case 30 so as to attach these elements together. The flange 40a on the fuel delivery device 40 is preferably square, with each bolt 72 passing through the flange 40a at a respective corner of the flange 40a, i.e. such that four bolts 72 in total are used. Note that the fuel delivery device 40 is preferably bolted to the inner case 30, since in use it should not be permitted to move with respect to a combustion chamber within the inner case 30 of the combustion equipment 15.

Various components of the legacy seal assembly 50 are preferably made from a high temperature material, e.g. a high temperature alloy, e.g. a high temperature nickel alloy such as Inconel (RTM) 625 or Inconel (RTM) 718. For example, the seal carrier and the liner 52 may be produced from Inconel (RTM) 718. The piston rings 62 may be produced from Haynes (RTM) 25.

In practice, the piston rings 62 must have a split or gap that allows their fitment onto the seal carrier 60. This gap allows some degree of leakage of pressurised air out from the hole in the outer case 32, through the gap that is bounded by the piston rings 62 the seal carrier 60 and the liner 52.

The piston rings 62 are preferably able to slide from side to side within the seal carrier 60 to allow relative movement of the inner and outer cases 30, 32 along the principal axis (labelled "x" in FIG. 2) of the gas turbine engine in which the seal assembly 50 is installed ("relative axial movement" of the cases 30, 32). The piston rings 62 are preferably also able to slide axially along the liner 52 to allow relative movement of the inner and outer cases 30, 32 in a direction that is radial with respect to the principal axis of the gas turbine engine in which the seal assembly 50 is installed ("relative radial movement" of the cases).

When the combustion equipment 15 is in use, relative radial movement of the inner and outer cases 30, 32 will normally involve the inner case 30 (and everything bolted to it, which normally includes the fuel nozzle 40, the seal carrier 60 and the air deflector 70) moving closer to the outer case 32 (i.e. such that the cavity between the inner and outer cases 30, 32 becomes smaller), with this movement being permitted by the piston rings 62 sliding axially along the liner 52 as described above.

To provide an effective seal against the liner 52 at their outer diameter, the piston rings 62 preferably have a small cross sectional area, which helps the piston rings 62 to be compliant against the liner 52. However, this small cross sectional area means that the piston rings 62 only contact the liner 52 across a relatively small area, leading to high contact pressures and high rates of wear for both the liner 52 and the outer diameter of the piston rings 62.

The split in the piston rings 62 may also mean the pressure that the piston ring 62 is sealing may push the piston rings 62 outwards against the liner 52, which may further increase wear to the liner 52 and the outer diameter of the piston rings 62. In practice, this effect is thought to be relatively small, however.

The liner 52, seal carrier 60, and the piston rings 62 can all wear over time, which can lead to an increase in leakage. Indeed, if the wear rate is very high, the piston rings 62 could wear through the seal carrier 60 and require replacement before routine shop visits, which could add to the cost of ownership. Furthermore, the entire legacy seal 50 may need to be scrapped at routine shop visits, also adding to cost of ownership.

Figure 4:
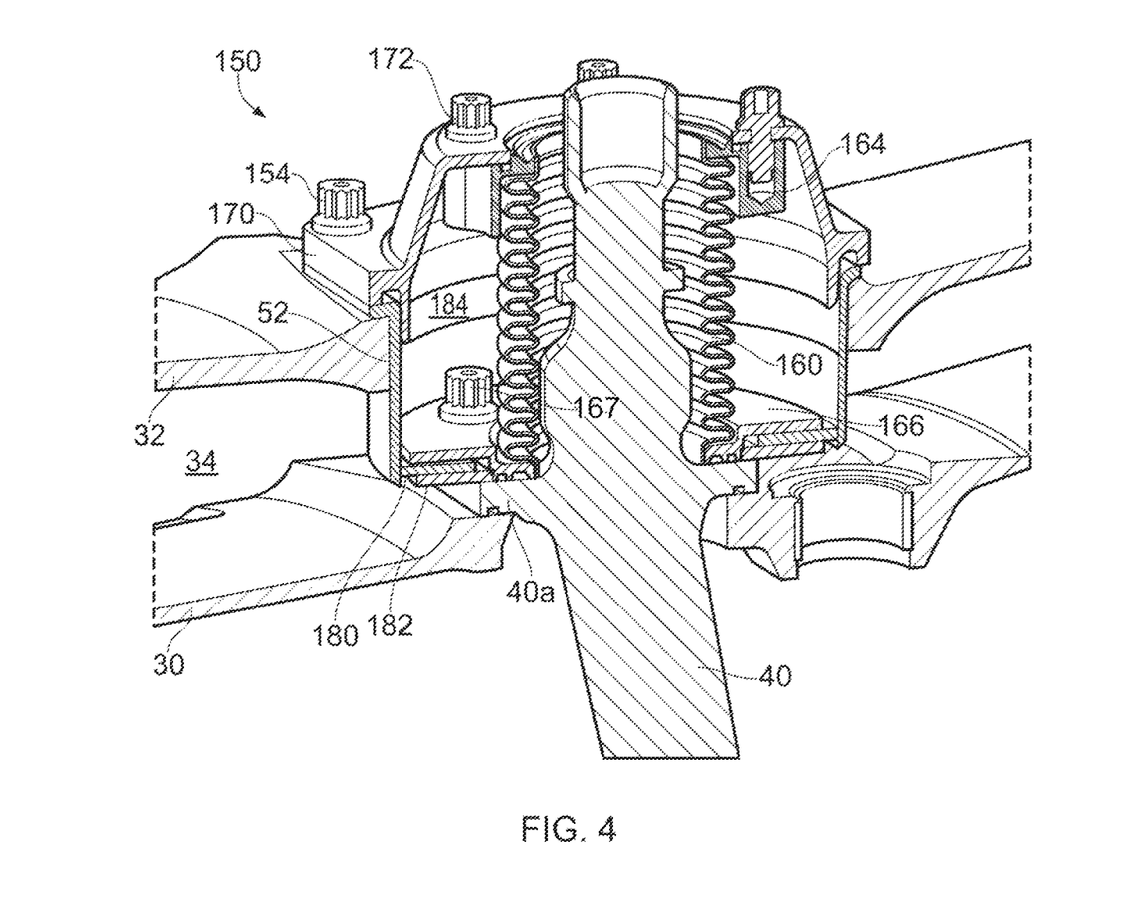
FIG. 4 is a 3D cross-sectional view of a seal assembly that is in accordance with the invention.
Figure 5:
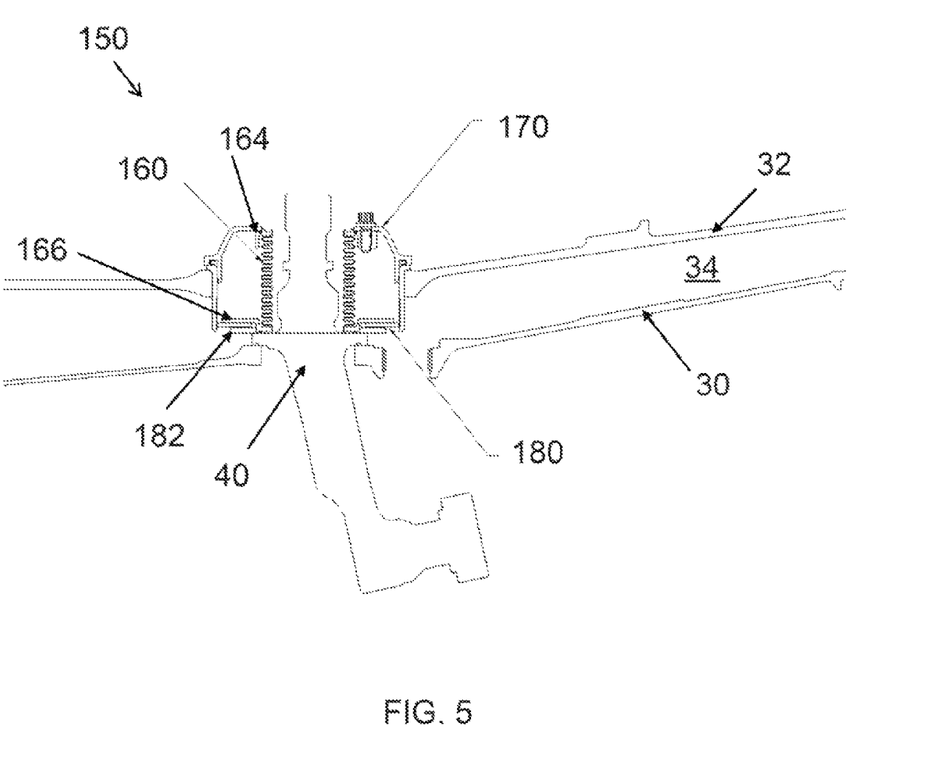
FIG. 5 is a 2D cross-sectional view of the seal assembly of FIG. 4, taken through a plane that is parallel to the principal axis of a gas turbine engine in which the seal assembly is installed.

In general, the following discussion, with reference to FIGS. 4 and 5, describes an example of a seal assembly 150 according to the invention, which is configured to seal a hole in the outer case 32 through which a fuel delivery device 40 passes, so as to inhibit pressurised gas in a cavity 34 located between the inner and outer cases 30, 32 from leaking out from the hole in the outer case 32 when the combustion equipment 15 is in use.

As discussed in more detail below, the seal assembly 150 preferably substantially prevents leakage using a flexible sleeve 160, which may have the form of a metallic bellows. The flexibility of the sleeve 160 preferably allows the relative movements of the inner and outer cases 30, 32 while providing a substantially complete barrier to leakage. With no rubbing parts, wear of the flexible sleeve 160 can be minimised or even avoided so that the seal provided by the flexible sleeve 160 need not deteriorate with use. Preferably, to mitigate the risk of failure of the flexible sleeve 160 (which would potentially result in a large over board leak) the seal assembly 150 may include a secondary seal 180 that is preferably able to accommodate the relative movements of the inner and outer cases 30, but has a larger contacting surface area so as to have a significantly reduced wear rate compared to the piston rings 62 in the legacy sleeve 50 described above.

In the seal assembly 150 shown in FIGS. 4 and 5, the inner case 30, the outer case 32, the liner 52 and the fuel delivery device 40 may be the same as described in connection with the legacy seal assembly 50 shown in FIG. 2.

The seal assembly 150 of FIGS. 4 and 5 preferably includes a sealing member which comprises a flexible sleeve 160 that extends around the fuel delivery device 40 and interconnects the inner case 30 with the outer case 32. The flexible sleeve 160 is preferably configured to flex in use so as to permit relative movement of the inner and outer cases 30, 32, preferably without rubbing against other components within the seal assembly 150.

Preferably, the flexible sleeve 160 is or includes a flexible tube, which may be a bellows that includes a plurality of folds. The plurality of folds in the flexible tube may provide the flexibility of the flexible sleeve 160. The bellows may be formed of a folded sheet, e.g. a sheet of metal. The folded sheet may be of a high temperature material, e.g. a high temperature nickel alloy such as Inconel (RTM) 625.

The flexibility of the flexible sleeve 160 preferably permits relative movement of the inner and outer cases 30, 32 while providing a substantially complete barrier to leakage. With preferably no rubbing/sliding parts, the flexible sleeve 160 preferably reduces or even completely avoids wear so that the seal assembly 150 need not deteriorate with use.

The seal assembly 150 preferably includes:

- an upper flange 164 attached to the flexible sleeve 160 at an upper (e.g. radially outer) end of the flexible sleeve 160, wherein the flexible sleeve 160 connects to the outer case 32 via the upper flange 164; and/or
- a lower flange 166 attached to the flexible sleeve 160 at a lower (e.g. radially inner) end (preferably opposite the upper end) of the flexible sleeve 160, wherein the flexible sleeve 160 connects to the inner case 30 via the lower flange 166.

The upper flange 164 may be attached to the flexible sleeve 160 at an upper (e.g. radially outer) end of the flexible sleeve 160 by welding. The lower flange 166 may be attached to the flexible sleeve 160 at a lower (e.g. radially inner) end of the flexible sleeve 160 by welding.

The seal assembly 150 preferably includes a cap 170 that is attached to the upper flange 164, e.g. via a plurality of bolts 172 each of which passes through the cap 170 and the upper flange 164 so as to attach these elements together. The cap 170 is preferably attached to the outer case 32, e.g. via a plurality of bolts 154 each of which passes through the cap 170, a flange of the liner 52, and the outer case 32 so as to attach these elements together. Thus, the flexible sleeve 160 preferably connects to the outer case 32 via the upper flange 164 of and the cap 170.

Preferably, the cap 170 bridges between the upper flange 164 and the outer case 32 in a manner that permits attachment of the fuel delivery device 40 and the lower flange 166 to the inner case 30 during installation of the seal assembly 150.

Of course, various other arrangements for connecting the flexible sleeve 160 to the outer case 32 are possible. For example, the upper flange 164 may be directly attached to the outer case 32, rather than via the cap 170. Thus, the cap 170 may be omitted in some embodiments.

The lower flange 166 is preferably attached to the inner case 30, e.g. via a plurality of bolts 167. Each of these bolts 167 preferably passes through the lower flange 166, the secondary seal 180 (discussed in more detail below), an annular retaining plate 182 (discussed in more detail below), a flange 40a of the fuel delivery device 40, and the inner case 30 so as to attach these elements together.

C seals may be positioned in the cap 170 and the upper and lower flanges 164, 166.

A key feature of the seal assembly 150 shown in FIGS. 4 and 5 is the inclusion of a secondary seal 180 that is located between the flexible sleeve 160 and the cavity 34 located between the inner and cuter cases 30, 32 such that an additional cavity 184 is formed between the secondary seal 180 and the flexible sleeve 160.

For the seal assembly 150 shown in FIGS. 4 and 5, the additional cavity 184 is preferably formed by the liner 52, the flexible sleeve 160, the cap 170 and the secondary seal 180. However, if the cap 170 is omitted (e.g. because the upper flange 164 is directly attached to the outer case 32, see above), the additional cavity 184 is preferably formed by the liner 52, the flexible sleeve 160 and the secondary seal 180.

The secondary seal 180 is preferably a solid metal ring, which is preferably close fitting, and which preferably seals against the liner 52. Because it is preferably solid (i.e. not sprung), the seal provided by the secondary seal 180 at the liner 52 may he relatively poor compared to the (sprung) piston rings 62 described above. However, this leakage is acceptable, since leakage through the secondary seal 180 allows the additional cavity 184 formed between the secondary seal 180 and the flexible sleeve 160 (which additional cavity 184 may be referred to as a "dead zone") to reach the same pressure as the cavity 34 between the inner and outer cases 30, 32, thereby allowing the flexible sleeve 160 to form a "primary seal" which preferably substantially prevents pressurised gas in the cavity 34 between the inner and outer cases 30, 32 from leaking out of the hole in the outer case 32.

A preferred role of the secondary seal 180 is that, in the event that the flexible sleeve 160 fails, the secondary seal 180 can reduce the amount of leakage out from the hole in the outer case 32 to an acceptable level, thereby preventing a large overboard leak. In addition to providing a backup to the flexible sleeve 160, the secondary seal 180 can also help to prevent bolts falling into the engine during assembly. However, whilst the level of leakage through the secondary seal 180 may be acceptable in the short term, it is envisaged that the flexible sleeve 160 should be repaired as soon as possible in the event that the flexible sleeve 160 fails.

The secondary seal 180 is preferably a "floating" seal which can slide from side to side to allow relative axial movement of the inner and outer cases 30, 32 (i.e. relative movement of the cases 30, 32 along the principal axis of the gas turbine engine in which the seal assembly 150 is installed). The secondary seal 180 is preferably able to slide axially along the liner 52 to allow relative radial movement of the inner and outer cases 30, 32 (i.e. relative movement of the cases 30, 32 in a direction that is radial with respect to the principal axis of the gas turbine engine in which the seal assembly 150 is installed).

In this way, the secondary seal 180 is able to accommodate relative movements of the inner and outer cases 30, 32 in a similar manner to the legacy seal assembly 50 described previously. In general this relative movement will involve a first assembly including the inner case 30 (and everything bolted to it) moving relative to a second assembly including the outer case 32 (and everything bolted to it).

Because the normal-condition pressure drop across the secondary seal 180 is relatively low (see explanation above), a close fitting solid metal ring is suitable for use as the secondary seal 180, which is advantageous because it takes longer to wear compared with a piston ring. The solid ring which may be used as the secondary seal 180 is preferably designed to have a larger contacting surface area compared with the piston rings 62 described above, thereby reducing the wear rate in the secondary seal 180 in the event of the primary seal failing. The trade off with increasing the contacting surface of the secondary seal 180 is the increased contacting surface worsens the seal provided by the secondary seal 180. However, some leakage through the secondary seal 180 is acceptable for the reasons already described. Also, the secondary seal 180 will not normally be exposed to the large pressure differential that the piston rings 62 of the legacy seal assembly is subjected to, since the primary seal provided by the flexible sleeve 160 will normally substantially prevent leakage. So the secondary seal 180 should only be subjected to the high pressure differential if the flexible sleeve 160 fails.

The secondary seal 180 may also prevent direct impingement of high pressure air onto the flexible sleeve 160, thereby reducing the thermal gradient in the flexible sleeve 160.

The secondary seal 180 is preferably held in position by the lower flange 166 and the annular retaining plate 182. Preferably, the annular retaining plate 182 is a separate element. Preferably the annular retaining plate 182 is positioned relative to the bottom of the lower flange 166 by assembly screws which hold the secondary seal 180 and the annular retaining plate 182 in position during assembly of the seal assembly 150 into combustion equipment of a gas turbine engine. These elements are preferably finally secured by the plurality of bolts 167 which pass through them (as well as passing through a flange 40a of the fuel delivery device 40 and the inner case 30) as described above. The bolts 167 may sometimes be referred to as "fuel spray nozzle" or "FSN" bolts to distinguish them from other bolts.

The choice of material for the flexible sleeve 160 is important as this material needs to have a high temperature capability (e.g. to withstand temperatures of 500° C. or higher) than other materials which may be used as a flexible sleeve in other context. For example, the flexible sleeve 160, the upper flange 164 and/or the lower flange 166 may be of a high temperature material, preferably a nickel alloy, preferably Inconel (RTM) 625, but other high temperature alloys/materials would be possible.

Various components are preferably made from a high temperature material, e.g. a high temperature alloy, e.g. a high temperature nickel alloy such as Inconel 625(RTM) or Inconel (RTM) 718. For example, as discussed above, the flexible sleeve 160, the upper flange 164 and the lower flange 166 may be manufactured from Inconel (RTM) 626. The cap may be manufactured from Inconel (RTM) 718. The secondary seal 180 and annular retaining plate 182 may be manufactured from Haynes (RTM) 25.

Some possible advantages of the seal assembly shown in FIGS. 4 and 5 are as follows:
  Able to provide a seal that is potentially leak free with no wear deterioration.
  Able to work at high temperatures.
  Able to last the life of engine, hence reducing cost of ownership compared with the legacy seal assembly 50 described above.
  Able to have a lower weight than the legacy seal assembly 50 described above.
  No special tooling is required.
  An air deflector is not required, because the amount of leakage is reduced compared with the legacy seal assembly 50 described above.

Figure 6:
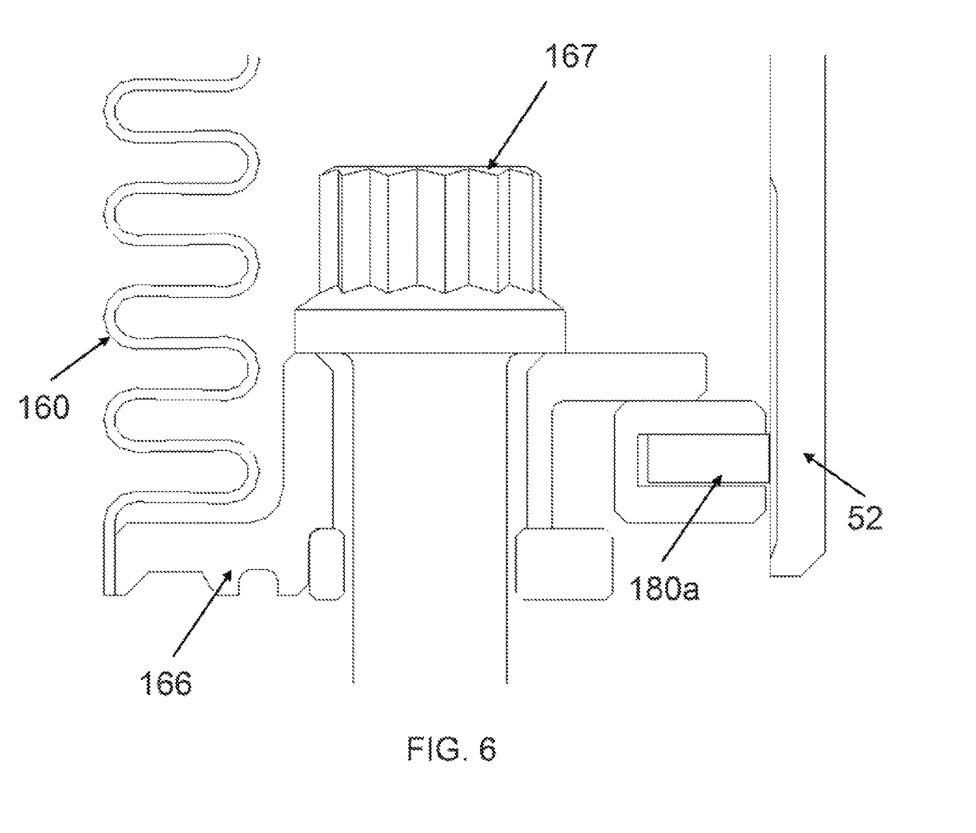
FIG. 6 is a 2D cross-sectional view of the seal assembly of FIG. 4, in which the secondary seal has been modified to take the form of a piston ring.

The role played by the secondary seal 180 means that the secondary seal 180 could take many different forms in practice. For example, as shown in FIG. 6, the secondary seal 180 could take the form of an (outwardly sprung) piston ring 180a to make an even more effective seal. In this case, wear will be lower than for the piston rings 62 of the legacy seal assembly 50, because the secondary seal 180 will not normally be subjected to a high pressure differential, unless the primary seal provided by the flexible sleeve 160 should fail.

In other embodiments, the secondary seal may be omitted all together.

When used in this specification and claims, the terms "comprises" and "comprising", "including" and variations thereof mean that the specified features, steps or integers are included. The terms are not to be interpreted to exclude the possibility of other features, steps or integers being present.

While the invention has been described in conjunction with the exemplary embodiments described above, many equivalent modifications and variations, which fall within the scope of the invention as claimed, will be apparent to those skilled in the art when given this disclosure. Accordingly, the exemplary embodiments of the invention set forth above are considered to be illustrative and not limiting. Various changes to the described embodiments may be made without departing from the scope of the invention.

The invention claimed is:

1. Combustion equipment for use in a gas turbine engine, the combustion equipment comprising:
  an inner case and an outer case, the outer case enclosing the inner case so that a first cavity is located between the inner and outer cases;
  a fuel delivery device for use in delivering fuel into a combustion region within the inner case, the fuel delivery device passing through a hole in the outer case and a corresponding hole in the inner case; and
  a seal assembly configured to seal the hole in the outer case through which the fuel delivery device passes so as to inhibit pressurized gas in the first cavity from leaking out from the hole in the outer case when the combustion equipment is in use,
  wherein:
    the seal assembly includes primary seal, a tubular sleeve, and a secondary seal,
    the primary seal includes (i) a flexible sleeve that extends around the fuel delivery device; (ii) a connection between the flexible sleeve and the inner case; and (iii) a connection between the flexible sleeve and the outer case, the flexible sleeve being configured to flex so as to permit relative movement of the inner and outer cases when the combustion equipment is in use, the flexible sleeve being a bellows that includes a plurality of folds,
    the tubular sleeve being provided in and sealing the hole in the outer case, the tubular sleeve extending from the hole in the outer case towards the inner case, the tubular sleeve surrounding the flexible sleeve, and
    the secondary seal is separate from the primary seal and is located between the flexible sleeve and the first cavity such that a second cavity is formed by the tubular sleeve, the secondary seal, and the flexible sleeve.

2. The combustion equipment according to claim 1, wherein:
  the fuel delivery device includes a flange that is secured to the inner case, and
  the seal assembly includes an upper flange, at an upper end of the flexible sleeve, and a lower flange, at a lower end of the flexible sleeve,
    the upper flange being connected to the outer case and the lower flange being connected to the inner case, and
    the lower flange abutting and being secured to the flange of the fuel delivery device.

3. The combustion equipment according to claim 1, wherein an upper end of the flexible sleeve is attached to a cap, the cap is attached to the outer case, and a lower end of the flexible sleeve is connected to the inner case such that the second cavity is formed by the cap, the tubular sleeve, the secondary seal, and the flexible sleeve.

4. The combustion equipment according to claim 1, wherein the secondary seal is located between the tubular sleeve and the flexible sleeve and the secondary seal abuts against a surface of the tubular sleeve.

5. The combustion equipment according to claim 4, wherein the secondary seal is configured to slide along the surface of the tubular sleeve in a radial direction of the gas turbine engine.

6. Combustion equipment for use in a gas turbine engine, the combustion equipment comprising:

an inner case and an outer case, the outer case enclosing the inner case so that a first cavity is located between the inner and outer cases;

a fuel delivery device for use in delivering fuel into a combustion region within the inner case,
the fuel delivery device passing through a hole in the outer case and a corresponding hole in the inner case, the fuel delivery device including a flange;

a seal assembly configured to seal the hole in the outer case through which the fuel delivery device passes so as to inhibit pressurized gas in the first cavity from leaking out from the hole in the outer case when the combustion equipment is in use,
wherein:
the seal assembly includes a primary seal and a secondary seal,
the primary seal includes (i) a flexible sleeve that extends around the fuel delivery device; (ii) a connection between the flexible sleeve and the inner case; and (iii) a connection between the flexible sleeve and the outer case, the flexible sleeve being configured to flex so as to permit relative movement of the inner and outer cases when the combustion equipment is in use, the flexible sleeve being a bellows that includes a plurality of folds,
a liner is provided in the hole in the outer case, the liner spaced from the flexible sleeve and arranged to surround the flexible sleeve,
the secondary seal is separate from the primary seal and is located between the flexible sleeve and the first cavity such that a second cavity is formed by the liner, the flexible sleeve, and the secondary seal, and
the flange of the fuel delivery device is directly connected to the inner case and is directly connected to the flexible sleeve.

7. The combustion equipment according to claim 6, wherein the flexible sleeve extends continuously around the fuel delivery device.

8. The combustion equipment according to claim 6, wherein the seal assembly includes:
an upper flange that is attached to the flexible sleeve at an upper end of the flexible sleeve, the flexible sleeve connecting to the outer case via the upper flange; and
a lower flange that is attached to the flexible sleeve at a lower end of the flexible sleeve, the flexible sleeve connecting to the inner case via the lower flange.

9. The combustion equipment according to claim 8, wherein the upper flange is attached to the outer case and the lower flange is attached to the inner case.

10. The combustion equipment according to claim 8, wherein the upper flange is attached to a cap, the cap is attached to the outer case and the lower flange is attached to the inner case.

11. The combustion equipment according to claim 8, wherein the lower flange is secured to the inner case, and the lower flange abuts and is secured to the flange of the fuel delivery device.

12. The combustion equipment according to claim 6, wherein the secondary seal is a solid metal ring.

13. The combustion equipment according to claim 6, wherein the secondary seal is a piston ring.

14. The combustion equipment according to claim 6, wherein the secondary seal is held in position by a retaining plate and/or a lower flange attached to the flexible sleeve at a lower end of the flexible sleeve.

15. The combustion equipment according to claim 6, wherein the seal assembly includes:
an upper flange that is attached to the flexible sleeve at an upper end of the flexible sleeve, the flexible sleeve connecting to the outer case via the upper flange; and
a lower flange that is attached to the flexible sleeve at a lower end of the flexible sleeve, the flexible sleeve connecting to the inner case via the lower flange,
wherein the upper flange is attached to a cap, the cap is attached to the outer case and the lower flange is attached to the inner case, and the second cavity is defined by the liner, the flexible sleeve, the cap, and the secondary seal.

16. The combustion equipment according to claim 6, wherein the combustion equipment has:
a plurality of fuel delivery devices for use in delivering fuel into the combustion region within the inner case, wherein each fuel delivery device passes through a respective hole in the outer case and a respective corresponding hole in the inner case; and
a plurality of seal assemblies, wherein each seal assembly is configured to seal a respective hole in the outer case through which a respective fuel delivery device passes so as to inhibit pressurized gas in a respective first cavity from leaking out from the respective hole in the outer case when the combustion equipment is in use;
wherein each seal assembly comprises a respective primary seal and a repective secondary seal.

17. The combustion equipment according to claim 6, wherein:
the flange is secured to the inner case, and
the seal assembly includes a lower flange that abuts and is secured to the flange of the fuel delivery device.

18. The combustion equipment according to claim 6, wherein an upper end of the flexible sleeve is attached to a cap, the cap being attached to the outer case, and a lower end of the flexible sleeve is connected to the inner case such that the second cavity is formed by the cap, the liner, the secondary seal, and the flexible sleeve.

19. The combustion equipment according to claim 6, wherein the secondary seal is located between the liner and the flexible sleeve and the secondary seal abuts against a surface of the liner.

20. The combustion equipment according to claim 19, wherein the secondary seal is configured to slide along the surface of the liner in a radial direction of the engine.

21. A gas turbine engine including the combustion equipment according to claim 6.

* * * * *